S. Wilson,
Cheese Hoop.
No. 107,315. Patented Sep. 13, 1870.

Saml Wilson  Inventor
Frank A. Hinds }
George F. Dresser } Witnesses

UNITED STATES PATENT OFFICE.

SAMUEL WILSON, OF WATERTOWN, NEW YORK.

IMPROVEMENT IN CHEESE-HOOP.

Specification forming part of Letters Patent No. 107,315, dated September 13, 1870.

*To whom it may concern:*

Be it known that I, SAMUEL WILSON, of Watertown, county of Jefferson, and State of New York, have invented a new and Improved Hoop for Pressing Cheese; and I do hereby declare that the following is a full and exact description thereof, reference being had to the accompanying drawings, and to the letters of reference marked thereon, making a part of this specification.

The nature of my invention consists in providing a metal cover having a perforated bottom with a rim from two to three inches high. Within the rim to this cover is placed an open hoop of the same material, consisting of a piece of sheet metal bent in the form of a hoop, and held in place by the rim of the cover. The hoop is then filled with curd to the top, and a cover with a rim about six inches wide, and having a large opening through the top, is placed on the top, but not pressed down until it is again filled. Then, placing a board on top, the cheese is put to press, the upper cover moving down as the cheese is compressed.

To enable others skilled in the art to make and use my invention, I will now proceed to describe its construction and operation.

Figure 2:
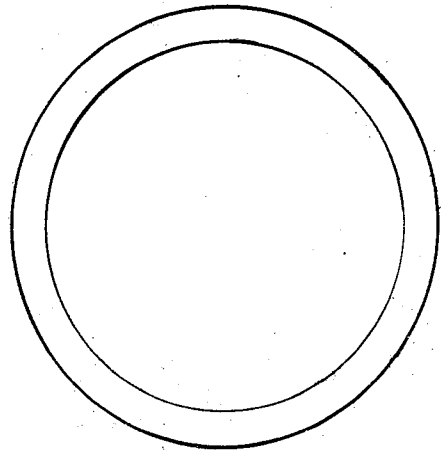

The lower cover, Figure 2 of the accompanying drawings, is made of tin or galvanized iron, or similar material. It is placed with the rim upward on the pressing-board, the holes $a$ $a$ through the bottom allowing the escape of the whey. $b$ represents the hoop, which is a rectangular piece of tin, iron, or other metal, about nine inches wide, and of sufficient length to encircle the cheese, with a lap of from one to two inches. This is bent into circular form, and is placed inside of the cover, the rim of which holds it together. A head-cloth is placed over the bottom, covering the holes, and the bandage is placed inside of the hoop, with the top turned over the outside, when the hoop is filled with curd. Then an upper cover, Fig. 2, of the same material, with a rim of about six inches in width, and a large opening in the top, leaving only a flange of about one and a half inch wide, is placed on the hoop, but not pushed down, and the hoop is again filled. Another head-cloth is placed on top, covered by a board, and submitted to the press. After pressing for a short time, the upper cover is removed, and the bandage is brought up to its place around the top of the cheese, and again pressed until finished.

Figure 4:
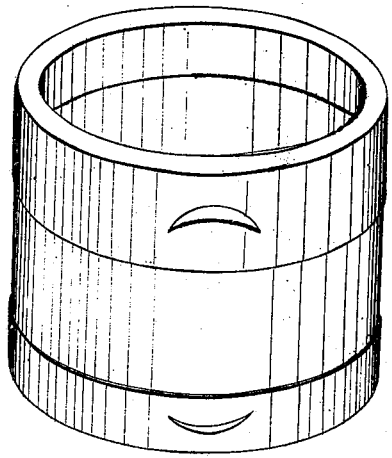
Figure 3:
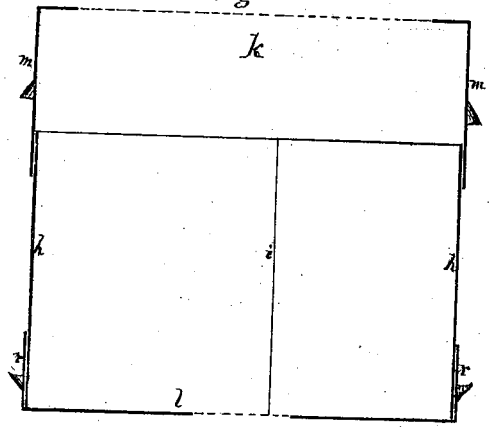
Figure 1:
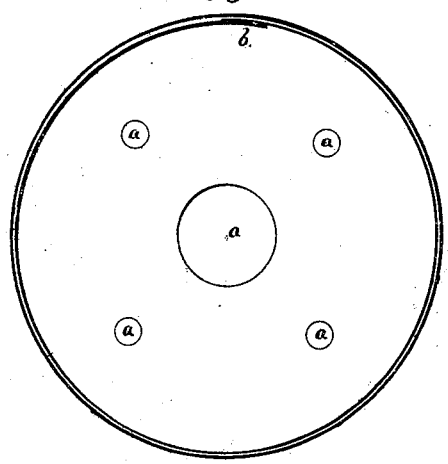

Fig. 3 shows a vertical section of the hoop, with both covers in position, $l$ being the lower cover with its rim $r$; $h$, the hoop, open at the line $i$, with its ends overlapping each other a little, as seen at $b$, Fig. 1, so as more easily to insert it in the cover, but of such length that the ends just meet when pressed out by the cheese. $k$, Fig. 3, is the upper cover, with its wide rim $m$, which is placed upon the hoop, but not pushed down until it is pressed down with the cheese. Fig. 4 shows a perspective view of the entire hoop.

The advantages claimed for this hoop over those in general use are, first, it saves the labor of turning the cheese while pressing; secondly, it requires no follower, but molds the corner of the cheese without the trimming usually found between the edge of the follower and the hoop; thirdly, it is not liable to press untrue; fourthly, it can be readily removed from the cheese by simply taking off the covers, as the hoop will then expand and fall off; fifthly, it dispenses with the use of the press-cloth.

What I claim as my invention, and desire to secure by Letters Patent of the United States, is—

The open hoop $h$ and the covers $l$ and $k$, sliding together over the hoop as the cheese is pressed, all substantially as and for the purposes herein set forth.

SAMUEL WILSON.

Witnesses:
   FRANK A. HINDS,
   GEORGE F. DRESSOR.